United States Patent [19]

Heiser et al.

[11] Patent Number: 5,748,148

[45] Date of Patent: May 5, 1998

[54] POSITIONAL INFORMATION STORAGE AND RETRIEVAL SYSTEM AND METHOD

[75] Inventors: Stephen J. Heiser; Joanna Mary Malvino, both of Fremont; Charles M. Wohl, Long Beach; Fausto Poza, Menlo Park, all of Calif.

[73] Assignee: H.M.W. Consulting, Inc., Freemont, Calif.

[21] Appl. No.: 531,219

[22] Filed: Sep. 19, 1995

[51] Int. Cl.$^6$ ........................................ G01S 3/02
[52] U.S. Cl. ................. 342/457; 342/419; 342/463; 340/825.49
[58] Field of Search ............................ 342/465, 450, 342/457, 419, 463; 340/825.54, 825.49

[56] References Cited

U.S. PATENT DOCUMENTS

| | | | |
|---|---|---|---|
| 4,952,928 | 8/1990 | Carroll et al. | 340/825.54 |
| 5,003,317 | 3/1991 | Gray et al. | 342/457 |
| 5,021,794 | 6/1991 | Lawrence | 342/457 |
| 5,243,652 | 9/1993 | Teare et al. | 380/21 |
| 5,452,328 | 9/1995 | Rice | 375/210 |
| 5,461,390 | 10/1995 | Hoshen | 342/419 |
| 5,485,163 | 1/1996 | Singer et al. | 342/457 |
| 5,510,798 | 4/1996 | Bauer | 342/357 |

OTHER PUBLICATIONS

Hoshen, Joseph, Sennott, Jim, Winkler, Max; *Keeping Tabs on Criminals*; IEEE Spectrum; Feb. 1995, pp. 26–32.

Sloan, Gene; *Totable locator uses satellites to help you find your way*; USA Today, Aug. 18, 1994, p. 4D.

Blair Smith, Elliot; *Steering by the stars*; The Orange County Register; Jul. 17, 1994, p. 1.

Rockwell International Corporation; *The Bottom Line: FleetMaster™ Pays for Itself... Then Pays You*; Rockwell brochure; Apr. 1994 (5M).

Department of Justice; *Electronic Monitoring in Intensive Probation and Parole Programs*; NCJ 116319; Feb. 1989, Reprinted Apr. 1994.

Anderson, David C.; *The Crime Funnel*; The New York Times Magazine; Jun. 12, 1994, pp. 56–58.

Mandel, Michael J., et al.; *The Economics of Crime*, Business Week; Dec. 13, 1993, pp. 72–81.

Speier, K. Jacqueline, Chairwoman; *Reshaping Government Through New Technologies*; Hearing of the Assembly Consumer Protection, Governmental Efficiency, and Economic Development Committee; Oct. 6, 1994.

*Primary Examiner*—Thomas H. Tarcza
*Assistant Examiner*—Dao L. Pham
*Attorney, Agent, or Firm*—Oppenheimer Poms Smith

[57] ABSTRACT

A positional information storage and retrieval system includes a positional detection unit transmitting positional information of at least one subject moving within an operational environment of the system, a plurality of receiver/transmitter units and a processor unit. Coordinate information of the receiver/transmitter units is received by the positional information unit and used to determine the positional information according to triangulation or other techniques embodied within the positional detection unit. The positional information is transmitted to the receiver/transmitter units which, in turn, transmit the positional information to the processor unit. A method for designing such a system includes selecting operational frequencies of the receiver/transmitter units and positioning the receiver/transmitter units throughout the operational environment such that distortion and attenuation of the positional information are minimized. Algorithms embodied within the processor unit generate, update and control access to a data base of information relating to locations of the subjects within the operational environment over time.

10 Claims, 9 Drawing Sheets

POSITIONAL INFORMATION STORAGE AND RETRIEVAL SYSTEM AND METHOD

BACKGROUND OF THE INVENTION

1. Field of the Invention

The present invention relates to a positional information storage and retrieval system and method and, more particularly, pertains to a system and method for storing and retrieving positional information of a subject moving within a particular environment.

2. Description of the Related Art

The problem of prison overpopulation continues to burden nations throughout the world, and particularly the United States of America where a relatively large percentage of our population is imprisoned. Many judges find themselves compelled to release potentially dangerous convicts because prisons are overpopulated. Accordingly, "in-house" arrest and similar programs where parolees are restricted in their movements to a predetermined area have been proposed as solutions to the foregoing problem.

Presently, some jurisdictions allow judges to offer an electronically supervised form of "house arrest" to persons convicted of certain crimes, in lieu of jail sentences. "Electronic house arrest" is implemented by placing a radio transmitter on the convict in the form of an anklet that is worn at all times. A radio receiver is located in the building to which the convict is to be restricted and continuously receives transmissions from the anklet. The range of the transmitter is low (approximately 75–100 ft.) such that a signal will be transmitted to the appropriate authorities or court officer if the convict strays beyond the range of the transmitter.

Additional societal problems stem from the present inability of law enforcement officials to quickly determine which, if any, of a group of "repeat offender" parolees were near the scene of a crime at the time of its commission. Although an "electronic house arrest" approach indicates when a subject has moved outside a predetermined region, no subsequent tracking capability is provided.

It has been suggested that the Global Positioning System (hereinafter GPS) may be employed to provide a long-range tracking capability of subjects such as parolees wearing transmitters. However, GPS and many other conventional navigational systems depend upon "line-of-sight" communications between the orbiting satellites and the transmitter unit. A parolee tracking system employing GPS may temporarily be rendered inoperable if the parolee is able to hide within buildings or otherwise interpose obstructions between the GPS satellites and the transmitter unit.

A system capable of accurately monitoring locations of a large number of subjects moving throughout an urban environment replete with structural and topographical obstructions would greatly enhance the ability of law enforcement officials to quickly determine which, if any, of the subjects was near the scene of a particular crime at the time of its commission. Such a system would ideally include processing facilities for generating, storing, updating and controlling access to a data base of subject locations monitored over time.

Accordingly, an object of the present invention is to provide a system for storing and retrieving positional information of a large number of subjects moving within an operational environment of the system.

Another object is to provide a system for storing and retrieving positional information, the system including a positional detection unit transmitting positional information, a processor unit generating, storing, updating and controlling access to a data base of subject locations monitored over time, and a plurality of receiver/transmitter units which relay the positional information to the processor unit.

Another object is to provide a system for storing and retrieving positional information wherein the plurality of receiver/transmitter units are ground-based units which are strategically positioned throughout the operating environment and which operate at frequencies selected to minimize distortion and attenuation of the positional information.

Another object is to provide a system for storing and retrieving positional information wherein the positional information is encrypted before transmission to the receiver/transmitter units to prevent unauthorized access to the positional information.

Another object is to provide a method for designing and implementing such a system.

SUMMARY OF THE INVENTION

In accordance with a specific illustrative embodiment of the present invention, a positional information storage and retrieval system includes a positional detection unit transmitting positional information of a subject moving within an operational environment of the system, a plurality of receiver/transmitter units and a processor unit. Coordinate information of the receiver/transmitter units is received by the positional detection unit and used to determine the positional information according to triangulation or other techniques embodied within the positional detection unit. The positional information is transmitted to the receiver/transmitter units which, in turn, transmit the positional information to the processor unit. Algorithms embodied within the processor unit generate, update and control access to a data base of information relating to locations of the subject within the operational environment over time.

In a further aspect of the present invention, the receiver/transmitter units are ground-based receiver/transmitter units which are strategically positioned throughout the operating environment and which operate at frequencies selected to minimize distortion and attenuation of the positional information.

In still another aspect of the present invention, the positional information is encrypted prior to transmission by the positional detection unit.

In yet another aspect of the present invention, a method for storing and retrieving positional information of at least one subject moving within an environment includes the steps of: transmitting positional information of at least one subject; providing a plurality of receiver/transmitter units for receiving and transmitting the positional information; providing a processor unit for processing the positional information and for controlling access to the data; and selecting operational frequencies of the receiver/transmitter units and positioning the receiver/transmitter units throughout the environment such that distortion and attenuation of the positional information are minimized.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 1:
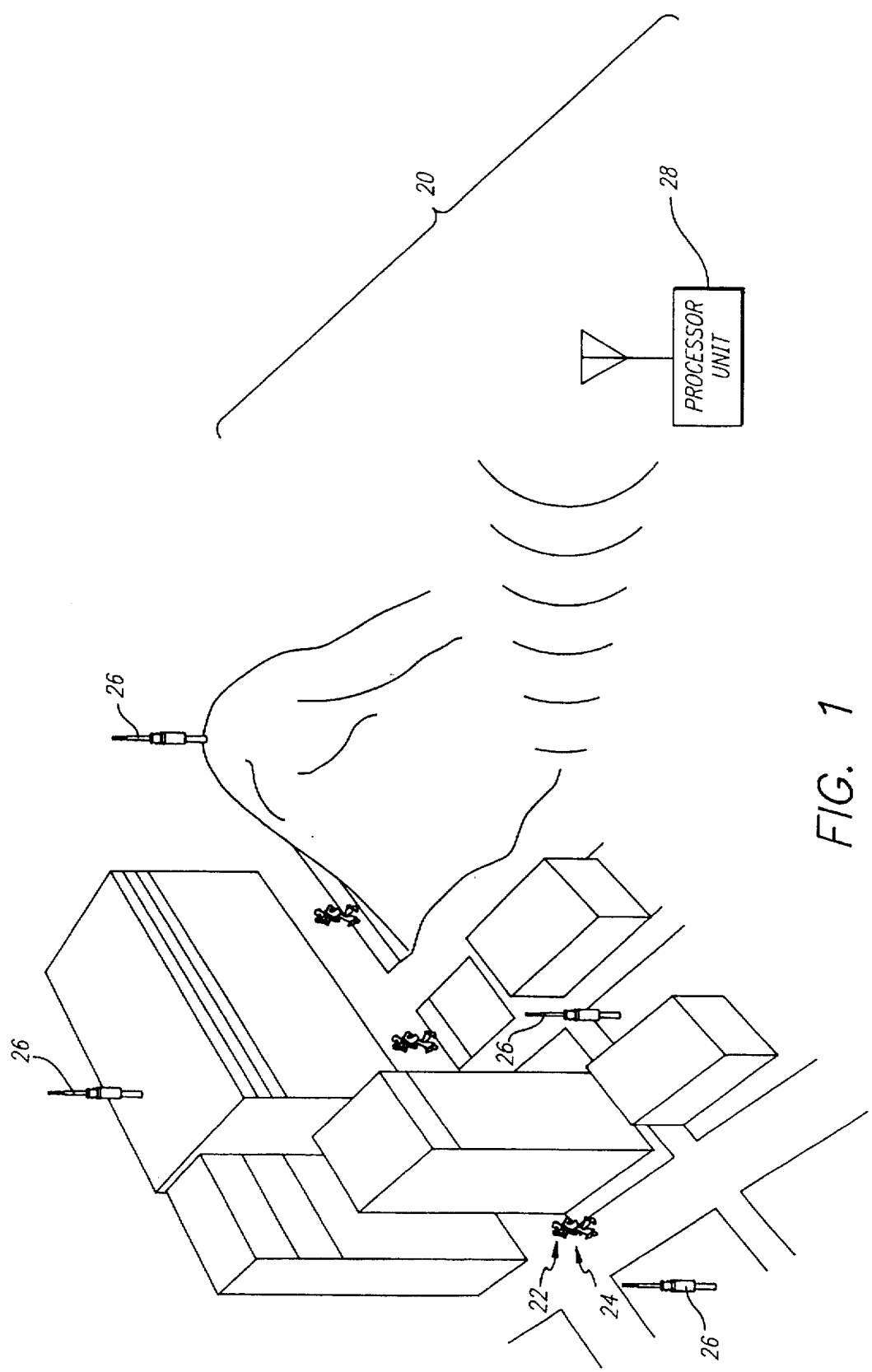
FIG. 1 shows the positional information storage and retrieval system of the present invention employed within an urban environment.

FIG. 1 shows a positional information storage and retrieval system 20 employed within an urban environment which includes a variety of topographical and structural obstructions. The system 20 includes a positional detection unit 22 which is attached to a moving subject 24, such as a parolee. Additionally, the system 20 includes a plurality of receiver/transmitter units 26 (hereinafter R/T units) and a processor unit 28.

The R/T units 26 shown in FIG. 1 transmit R/T unit coordinate information which is received by the positional detection unit 22. The R/T coordinate information is processed by microcircuitry within the positional detection unit 22 to generate positional information indicating where the positional detection unit is relative to the R/T units 26. The positional detection unit 22 then transmits the positional information back to at least one of the receiver/transmitter units 26 which, in turn, transmits the positional information to the processor unit 28.

The processor unit 28 receives positional information from the R/T units 26 for at least one subject 24. Algorithms realized within the processor unit 28 manipulate the received positional information to maintain and update a data base of each subject's location as a function of time. The R/T units 26 are strategically distributed throughout the operating environment of the system 20 at absolute coordinates which are made available to the processing unit 28. The positional detection unit 22 may directly employ known coordinates of the R/T units 26 to provide positional information to the processing unit 28 indicating an absolute position of each positional detection unit 22. The processor unit 28 utilizes the positional information received from the R/T units 26 to track an absolute position of each positional detection unit 22 (and therefore an absolute position of each subject 24).

The processor unit 28 embodies a variety of data processing, storage and retrieval capabilities. Advanced data processing capabilities include algorithms which employ the positional information received and stored over time to calculate a trajectory ("vector") of a particular subject or individual trajectories of a plurality of subjects. Additionally, the data processing and storage capabilities of the processor unit 28 facilitate the rendering of a plot ("density") of subjects near a particular location, such as the scene of a crime, at a particular time.

An important feature of the present invention is that the processor unit 28 strictly limits access to the positional data and the information derived therefrom, so that only authorized individuals may access the system 20. As discussed below in greater detail, a password scheme is employed to limit access to the system 20.

An additional feature of the positional information storage and retrieval system 20 shown in FIG. 1 is that operational frequencies of the plurality of ground-based R/T units 26 are selected such that distortion and attenuation of the positional information are minimized. As discussed below in greater detail, a method for designing the system 20 includes a procedure for optimally selecting the aforementioned operational frequencies and for strategically positioning the ground-based R/T units 26 throughout an operating environment of the system 20 such that distortion and attenuation of the positional information are minimized.

Figure 2:
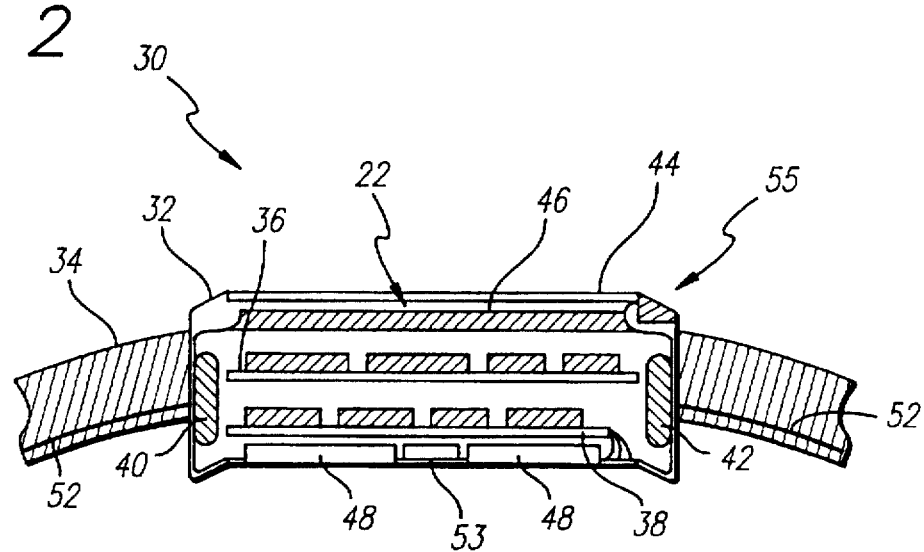
FIG. 2 is a cross-sectional side view of a wrist bracelet of the positional information storage and retrieval system with a positional detection unit assembled therein.

FIG. 2 is a cross-sectional side view of a wrist bracelet 30 with the positional detection unit 22 assembled therein. The wrist bracelet 30 includes a housing 32 and a band 34. Components of the positional detection unit 22 assembled within the housing 32 include a processor circuit board 36, a receiver/transmitter circuit board 38, a receiver antenna 40 and a transmitter antenna 42. The antennas 40, 42 are preferably of a coil type. The bracelet apparatus 30 additionally includes a glass lens 44 or other transparent face material and, optionally, a display mechanism 46 positioned to be visible through the glass lens 44. The display mechanism 46 may comprise an array of liquid-crystal displays (LCDs) the illumination of which is controlled by signals generated by the processor circuit board 36. The bracelet apparatus 30 also includes at least one power source 48 such as the two batteries shown in FIG. 2. The display mechanism 46 may alternatively comprise an array of light-emitting diodes (LEDs). However, such a display mechanism is less desirable because it consumes more power.

Energy conservation is an important consideration in the design of the wrist bracelet 30. The processor within the bracelet 30 is programmed to only transmit the positional information as frequently as is needed. Additionally, the processor circuit board 36 includes electronics for measuring the strength of signals received from the R/T units 26. A preferred embodiment of the wrist bracelet 30 conserves the energy of its power source 48 by only transmitting positional information when the strength of a received signal is greater than a predetermined value. Thus, the bracelet 30 will only transmit positional information to transponders which are close enough to receive positional information that is transmitted at a relatively low power level.

The processor within the bracelet 30 may additionally be programmed to vary the predetermined signal level above which signal transmission is permitted. For example, the processor may be programmed to decrease the predetermined signal threshold and to simultaneously increase the power at which the bracelet 30 will transmit as the interval during which no positional data has been transmitted increases in duration. The increased transmission power compensates for increased distances between the bracelet 30 and the nearest R/T unit 26.

In addition to a tracking mode, the system 20 may also operate in an alarm mode where much more frequent transmissions of the positional information are required. For example, the processor in the bracelet 30 may be used for enforcing a restraining order and therefore should transmit the positional information much more frequently.

Figure 3:
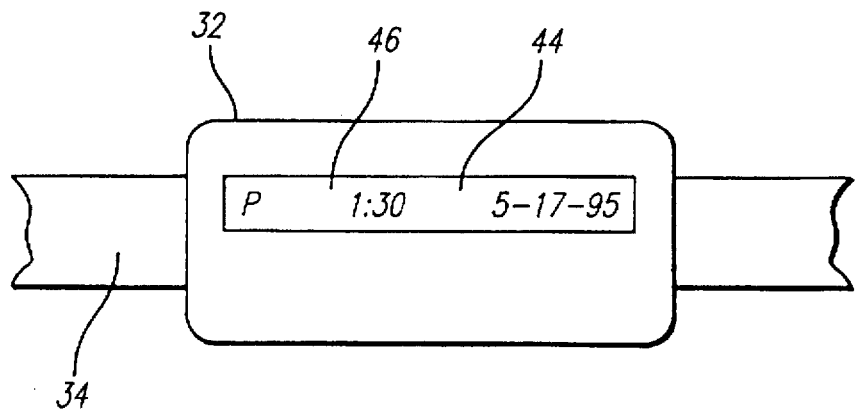
FIG. 3 is a top view of the wrist bracelet of FIG. 2.

FIG. 3 is a top view of the wrist bracelet 30 showing the LCD display mechanism 46 through the glass lens 44. Although a preferred bracelet apparatus 30 is sized and designed to be fitted about the wrist, the subject matter of the present invention additionally contemplates alternative housing and securing configurations such as one which could be fitted about the ankle.

Figure 4:
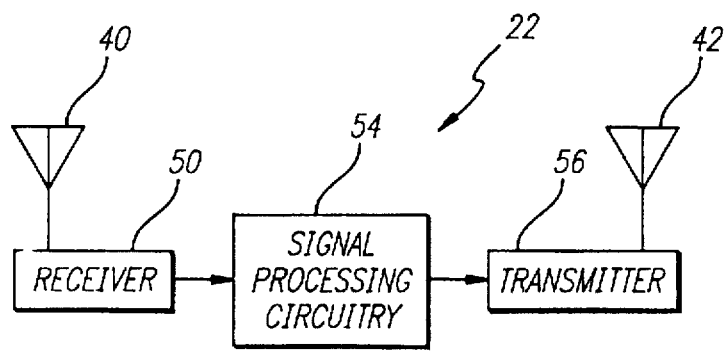
FIG. 4 is a functional block diagram the positional detection unit of FIG. 2.
Figure 9:
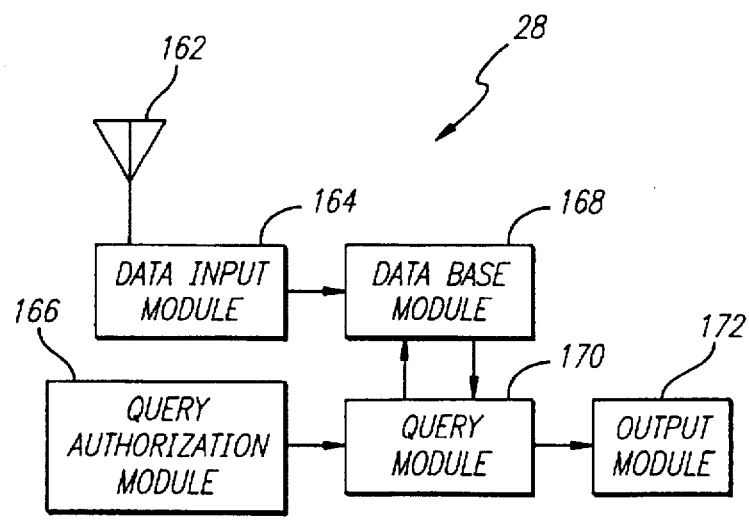
FIG. 9 is a functional block diagram of a processor unit of the positional information storage and retrieval system of FIG. 1.

FIG. 4 shows the positional detection unit 22 in the form of a functional block diagram. The positional detection unit 22 includes a receiver 50 and the receiving antenna 40 which is electrically connected thereto. The receiving antenna 40 receives the coordinate information of the R/T units 26. The positional detection unit 22 also includes signal processing circuitry 54, a transmitter 56 and the transmitting antenna 42. In a preferred embodiment, the signal processing circuitry 54 comprises microcircuitry assembled within the bracelet apparatus 30, and more specifically within the processor circuit board 36 (FIG. 2). The microcircuitry embodies triangulation and other algorithms which generate the positional information from received coordinate information of the R/T units 26. The receiver 50 and the transmitter 56 are similarly embodied as a custom integrated circuit, for example, in the receiver/transmitter circuit board 38 of FIG. 2.

Figure 5:
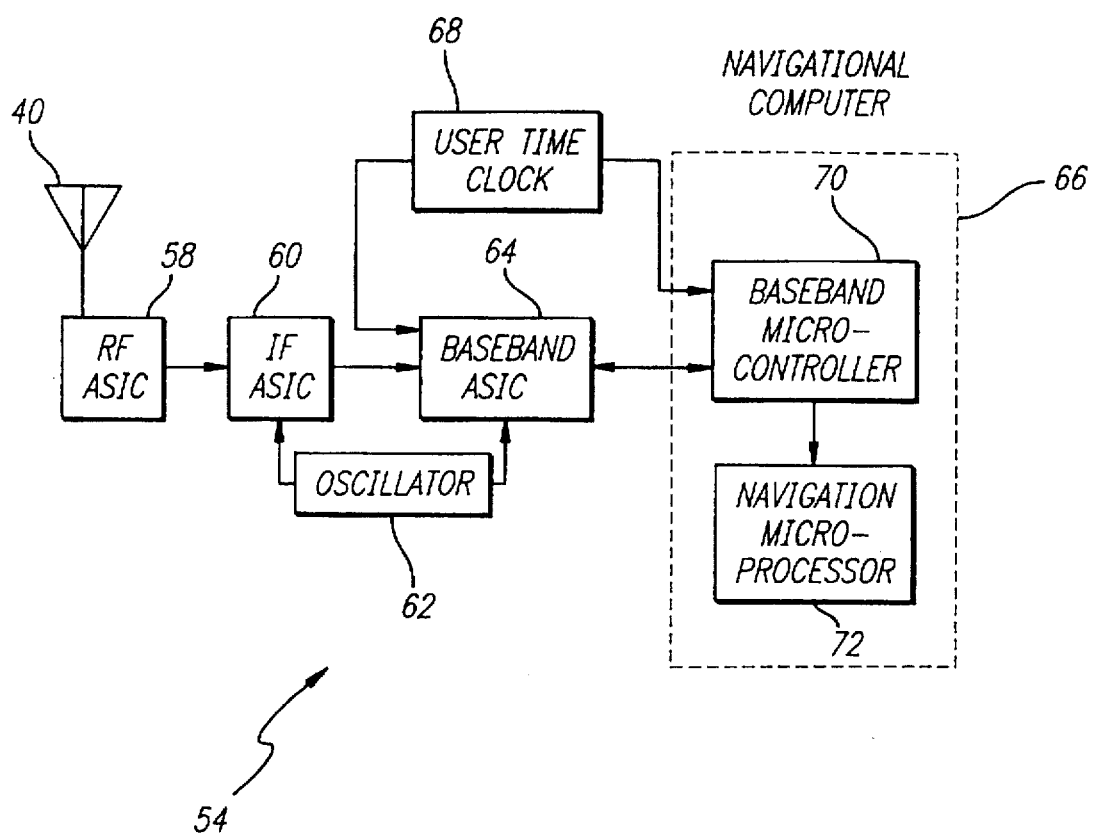
FIG. 5 is a functional block diagram of signal processing circuitry included within the positional detection unit.

FIG. 5 is a functional block diagram of the signal processing circuitry 54 which is preferably, but not necessarily, included within the positional detection unit 22. Upon receiving a radio frequency (RF) signal from one of the receiver/transmitter units 26, a radio frequency module 58 amplifies and downconverts the information signal to an intermediate frequency (IF). The radio frequency module 58 preferably comprises an RF Application Specific Integrated Circuit (ASIC). The downconverted signal is then digitized by an IF ASIC 60 at a rate specified by an oscillator 62 such as a Temperature Compensated Crystal Oscillator (TCXO). The resulting data stream is then provided to a baseband ASIC 64. As may be readily appreciated, the signal processing circuitry 54 may alternatively comprise discrete electronic components and need not be embodied in the form of an ASIC.

The signal processing circuitry 54 additionally includes a navigational computer 66 and a clock 68 as shown in FIG. 5. In conjunction with the navigational computer 66, the baseband ASIC 64 performs high speed digital processing (such as code synthesis, correlation, integration, carrier reconstruction, punctual and early late in-phase quadrature detection) for a plurality of signals from the R/T units 26. The navigational computer 66 further comprises a baseband microcontroller 70 which performs slow speed functions such as bit synchronization and code and carrier loop filtering. The user time clock 68 maintains time synchronization for the processing modules in the event of received signal dropout and also provides a time output for the wrist unit to function as an ordinary timepiece. Position computations are carried out by an interaction of the baseband ASIC 64 with the navigational computer 66. Preferably, the navigational computer 66 also includes a navigation microprocessor 72. The baseband microcontroller 70 and the navigation microprocessor 72 provide the processing power required to implement the navigational positioning algorithms and preferably comprise an Intel 80C186 microcontroller and an Intel 80C187 microprocessor, respectively. The navigational computer 66 additionally includes random access memory (RAM) and other circuitry required for conventional programming. The navigation computer receives measurements from the baseband ASIC 64 and carries out navigation and integrity monitoring functions. Navigation computations are carried out by the software embodiment of an eight-state Kalman filter: three-position, local clock error, three-velocity and local clock frequency error. The operating program is stored in a flash read only memory (ROM) allowing the locating device to be easily upgraded, thereby facilitating the addition of new features.

Coordinate information of the R/T units 26 is received by the positional detection unit 22 and used to determine the positional information according to triangulation or other techniques embodied within the positional detection unit 22. Ranging signals from a network of R/T units 26 (aka "base stations") are acquired by the positional detectional unit 22. Signal processing elements within the positional detection unit 22 (aka "locator device") convert the ranging signals to measurements of the range to each base station. The microprocessor or microprocessors within the locator device use the measured ranges to compute a position fix, i.e., an estimate of the present position of the locator device. A position report embodying the positional information is thereafter transmitted to the network of R/T units 26 by the radio communications elements of the locator device 22.

Algorithms embodied within the positional detection unit 22 compute position estimates from the coordinate information which is transmitted from the R/T units 26 to the positional detection unit 22. Preferably, at least three R/T units 26 are employed in the operating environment. A conventional least-squares method may be employed to solve the position estimate problem. Equations for the conventional least-square estimation method are:

$$\hat{x} = (H^T H)^{-1} H^T \hat{z}$$

$$P = (H^T H)^{-1} H^T R H (H^T H)^{-1}$$

where $\hat{x}$ = state vector of parameters to be estimated

H = matrix of observation coefficients which expresses the relationship between measurement residuals and the states to be estimated $\hat{z}$ = vector of measurements P = matrix containing the estimate of the covariance of the error in the state estimate.

R = estimate of uncertainty in the measurements of $\hat{z}$

T is the matrix transpose operator

The state vector $\hat{x}$ of parameters to be estimated includes two coordinates of horizontal position of the positional detection unit 22. The vector of measurements ẑ is comprised of the ranges to each of the R/T units 26. The matrix H is computed from the geometric relationship of the base stations 26 to the last estimated position. The matrix P provides an estimate of the error in the positioned estimate. Fixed coordinates for each of the R/T units or base stations 26 are programmed into a memory device of the positional detection unit 22. The ability of the least squares method to utilize additional measurements beyond the minimum required for state estimation (overdetermined solution) is a key benefit. Additional measurements contribute more accuracy to both the position estimate and its associated error estimate. The positional detection units 22 are readily capable of computing a position estimate in view of the processing power available in today's microcontrollers and additionally because the reporting interval is typically infrequent.

Algorithms which are preferably embodied within a processor unit 28 (FIG. 1) monitor the operational integrity of the bracelet apparatus 30 and, for example, detect a malfunctioning condition of the positional detection unit 22 or a detachment of the bracelet apparatus 30 from the subject 24. For example, the processor unit 28 monitors the frequency of transmissions to determine if a malfunctioning condition exists.

In the embodiment illustrated in FIG. 2, the bracelet 30 additionally includes a sufficiently fragile wire loop 52 or similar mechanism which breaks when the bracelet 30 is improperly removed from the subject 24. When such an open circuit condition is detected, an alarm 55 may be activated to transmit a "distress signal" at maximum power. Receipt of the "distress signal" indicates that the security of the transmitting bracelet has been breached. Even if the bracelet 30 is subsequently reattached, all further transmissions from that bracelet will include a "security breached signal" until, for example, the subject 24 presents himself and his bracelet 30 to appropriate personnel who are authorized to reset and reattach the bracelet 30.

FIG. 2 also shows that the bracelet 30 includes a temperature sensor 53 in thermal contact with the body of the subject 24. When the processor unit 28 detects no movements of the subject 24 for more than a predetermined period of time and an unacceptably low temperature reading from the temperature sensor 53, the processor unit 28 may be programmed to indicate that the subject appears to have removed the bracelet 30 without breaking the wire loop 52.

The signal processing circuitry 54 of the bracelet 30 may, but does not necessarily, include circuitry for encrypting the positional information before it is relayed to the transmitter 56. Encryption of the positional information serves to prevent unauthorized individuals from gaining access to information disclosing the whereabouts of subjects 24 to whom bracelet apparatuses 30 are attached. As may be readily appreciated, an embodiment of the present invention employing encryption techniques also provides the processing unit 28 (FIG. 1) with appropriate decoding hardware, software, etc.

A simple encryption scheme is preferred to the extent that it minimizes power usage by the processing unit performing the encoding function. A preferred encryption scheme should also embody the ability to periodically change certain parameters of the encoding scheme to maximize security.

A simple as well as power efficient encoding scheme involves the imposition of a translation scheme on a message to render the message incomprehensible. One possible translation scheme is to associate with each letter of the alphabet another letter, and then use this to encode the message. For example, a b c d e f g h i j k l m n o p q r s t u v w x y z
z y x w v u t x r q p o n m l k j i h g f e d c b a Thus, "svool gavlv" means "hello there". However, such a method is easily decoded even if the translation key is changed periodically.

Another scheme meeting both specified requirements is a transcription cipher wherein the characters of a message are rearranged in a regular manner. For example, Ambrose Bierce's remark that "patience is a minor form of despair disguised as a virtue" may be written as follows:

PATIENCE
ISAMINOR
FORMOFDE
SPAIRDIS
GUISEDAS
AVIRTUE.

A transcription cipher may provide, for example, that words of a sentence are formed by reading the resulting characters in vertical columns: Pifsga asopuv taraii immisr eioret nnfddu codiae eress. Alternatively, a transcription cipher may provide: that characters are read diagonally; that characters in horizontal lines are read backwards, or that characters are read in some other pre-arranged manner.

The parameters for the scheme are two integer values and a two-character code which represent the key to decoding the message. The first two (integer) values of this key specify the size of the array (row by column) in which to place the letters of the message. Following the second digit will be one of the following letter pairs which specify how to place the letters of the message into the defined array, and how to read the decoded message:

RB: place them row-by-row backwards into the array and read the columns left to right RF: place them row-by-row forwards into the array and read the columns left to right CU: place them column-by-column upwards into the array and read the rows top down CD: place them column-by-column downwards into the array and read the rows top down.

The foregoing exemplary scheme requires more power to implement but provides greater security than a translation scheme, provided the parameters are changed periodically.

Figure 6A:
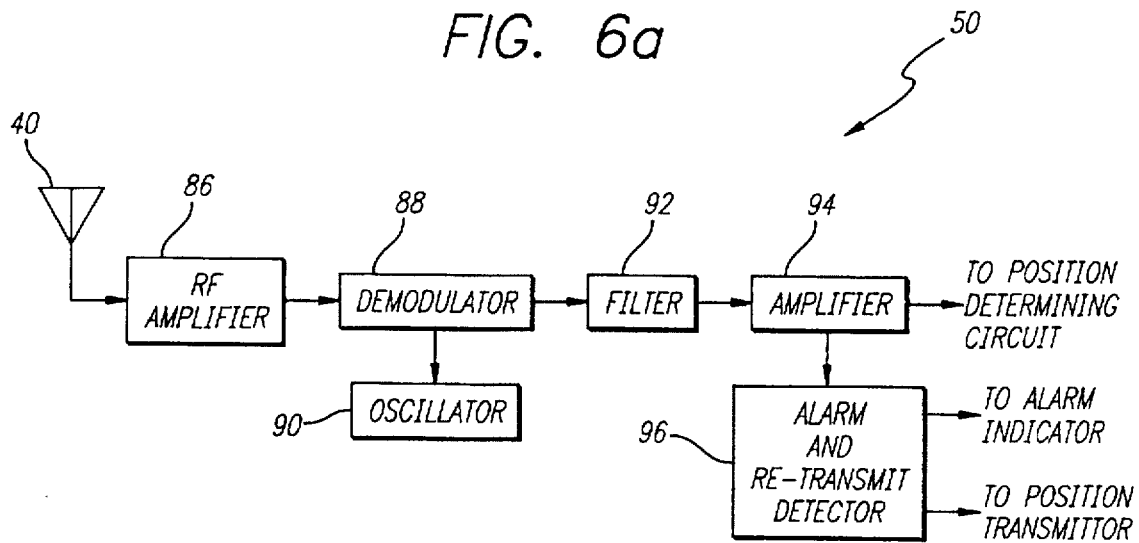
FIGS. 6a and 6b are functional block diagrams of the receiving and transmitting circuitry included within the positional detection unit.
Figure 6B:
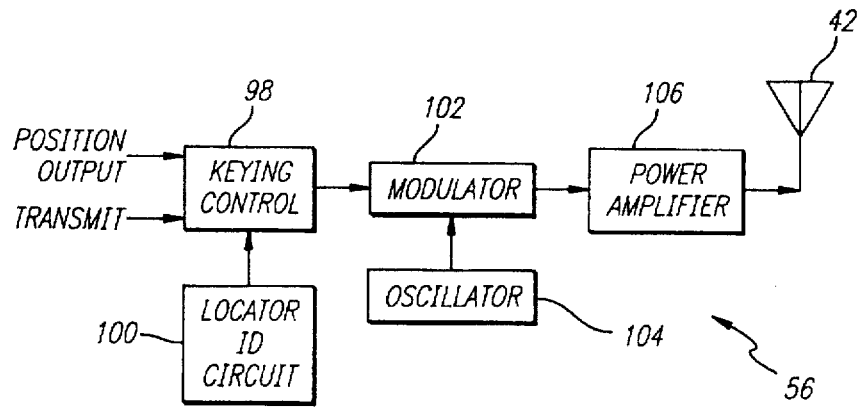

FIGS. 6a and 6b are functional block diagrams of the receiving and transmitting circuitry included within the positional detection unit 22. As discussed more generally with reference to FIG. 4, the positional detection units 22 include the locator position receiver 50 and the position transmitter 56. The locator position receiver 50 receives the coordinate information at the receiver antenna 40. The receiver 50 includes an RF amplifier 86 which preferably comprises a high gain, low noise type amplifier. The output of the RF amplifier 86 is provided to a demodulator 88. An oscillator 90 removes the carrier frequency from the received modulated carrier wave input provided by the RF amplifier 86. A filter 92 blocks any radio frequencies from reaching the input to an amplifier 94 which provides amplification for the position determining circuits.

The receiver 50 also functions as an alarm and re-transmit receiver which provides means for receiving the alarm and/or the re-transmit from the R/T units 26. As shown in FIG. 6a, the amplifier 94 also provides amplification for the alarm and/or re-transmit signal. An alarm and re-transmit detector 96 determines if the input signal is a valid input for a particular positional detection unit 22. If the input signal is valid, the alarm and re-transmit detector 96 determine which input is present and provide the appropriate output.

The position transmitter 56 (FIG. 6b) provides the positional information generated by the positional detection unit 22 to the R/T units 26. A keying control circuit 98 (as controlled by the positional information input), a transmit control input and a locator ID circuit 100 provide a positional detection unit ID and the positional information to a modulator 102. The input from the keying control 98 is modulated with a carrier frequency from an oscillator 104. The resulting modulated carrier frequency is amplified by a power amplifier 106 and provided to the transmitter antenna 42 as shown. The locator device transmitter preferably comprises a low power, drain-type transmitter.

Preferably, a single receiver 50 is employed along with conventional signal multiplexing techniques for receiving the alarm and re-transmit signals. Although the bracelet 30 may include separate, dedicated receivers, such an approach is less preferred due to increased power consumption, component volume, and crosstalk between the additional receiver antennas.

Although the positional transmitter 56 may be programmed to automatically transmit (e.g., periodically), a preferred transmitter 56 conserves energy by only transmitting in response to a transmission authorization signal received by the receiver 50.

Figure 7A:
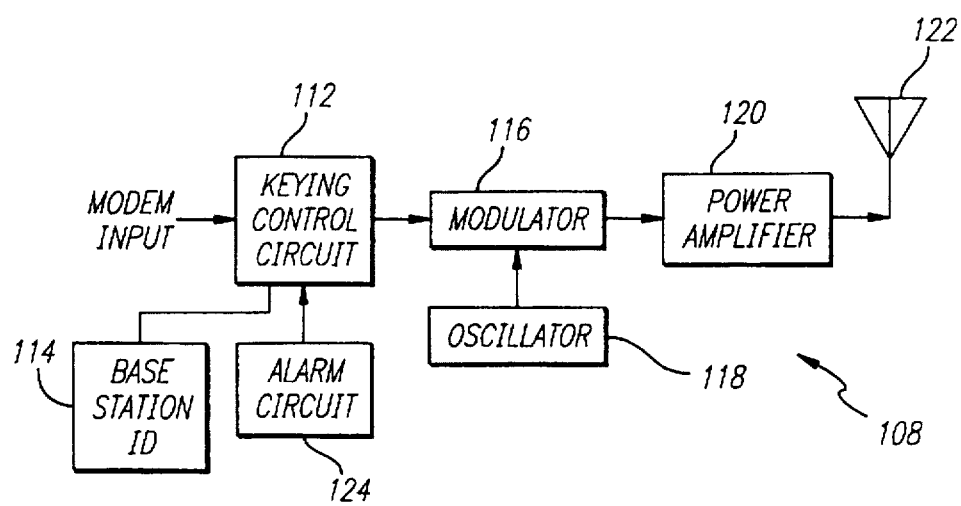
FIGS. 7a and 7b are functional block diagrams of the transmitting and receiving circuitry included within the receiver/transmitter units.
Figure 7B:
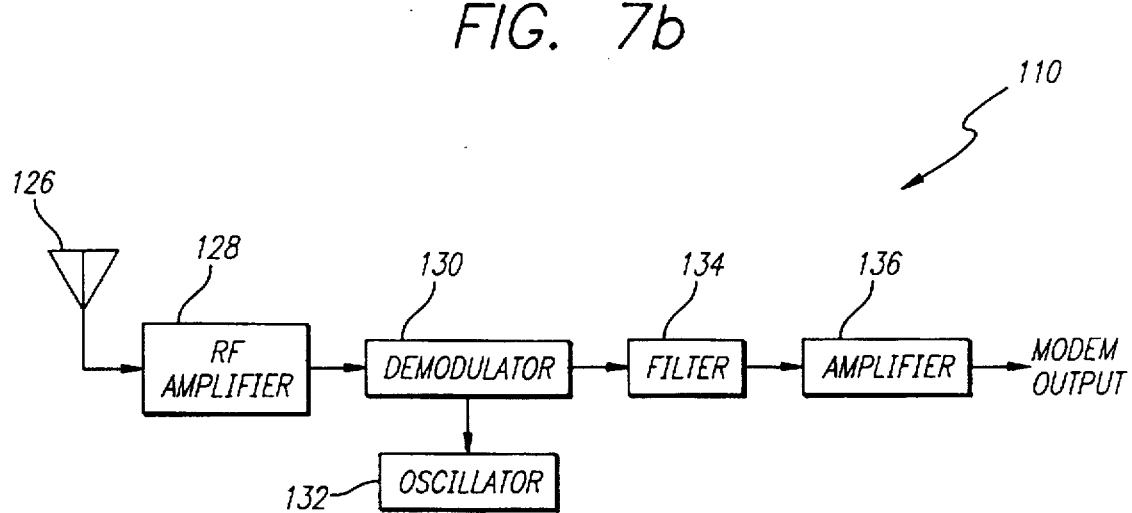

FIGS. 7a and 7b are functional block diagrams of the transmitting and receiving circuitry included within the R/T units 26. Generally, the transmitting and receiving circuitry includes a position transmitter 108 (FIG. 7a) and a locator position receiver 110 (FIG. 7b). The position transmitter 108 provides the coordinate information to the positional detection unit 22 and should have sufficient power to cover its selected location. A keying control circuit 112, as controlled by the modem input and base station ID 114, provides an ID and coordinate code to a modulator 116. A carrier frequency from an oscillator 118 is modulated with the ID and coordinate code at the modulator 116. The resulting modulated carrier frequency is then provided to a power amplifier 120 which, as shown in FIG. 7a, is electrically connected to a transmitting antenna 122.

The position transmitter 108 also functions as an alarm and re-transmit transmitter. An alarm circuit 124 generates an alarm signal which may be used, for example, for a victim locator device. The keying control circuit 112 is controlled by either the modem or alarm circuit 124 and provides a selected locator device ID and either an alarm or re-transmit code to the modulator 116.

Preferably, the processor unit 28 is employed to determine when an alarm condition signal should be transmitted to the bracelet 30 of a subject 24. By way of example, the alarm 55 of a parolee's bracelet 30 is activated when the parolee strays too near to a prohibited area. Conversely, the bracelet 30 of a first subject 24, who is to be protected from a second subject, may be prompted to sound a warning if the second subject gets too close to the first subject. The foregoing alarm conditions may, alternatively, be determined by a processor within the bracelets 30.

The locator position receiver 110 (FIG. 7b) provides means for receiving the positional information from the positional detection unit 22. A receiving antenna 126 provides the information to an RF amplifier 128 which preferably comprises a high gain, low noise type amplifier. The output of the RF amplifier 128 is then provided to a demodulator 130. As controlled by an oscillator 132, the demodulator 130 removes the carrier frequency from the received modulated carrier wave input. A filter 134 blocks any radio frequencies from being applied to the input of an amplifier 136 which, in turn, provides amplification for the positional information.

A method according to the present invention for storing and retrieving positional information of at least one subject 24 includes the following steps: providing a positional detection unit 22 to at least one subject 24 for transmitting positional information; providing a plurality of the R/T units 26 for transmitting R/T unit coordinate information to the positional detection unit 22 and for receiving and transmitting the positional information; providing a processor unit 28 for processing (and decoding if necessary) the positional information and for storing and controlling access to the data; and selecting operational frequencies of the R/T units 26 and positioning the R/T units 26 throughout an operating environment of the system 20, such that distortion and attenuation of the positional information are minimized.

The foregoing method facilitates optimization of the system 20 shown in FIG. 1 for an urban environment where variations in topography and/or man-made structures may temporarily render a "line-of-sight" system inoperable, as the subject 24 travels through the environment.

The attenuation of radio frequencies is influenced by the following factors: distance traveled; reflection; and absorption. Attenuation caused by distance traveled can be considered as a constant factor for all radio frequencies. Attenuation caused by reflection and absorption, however, are frequency dependent. Reflection of radio waves is caused by obstructions (man made or natural objects) in the path of the radio waves. Radio waves are more prone to the effects of reflection attenuation at higher frequencies. Absorption is a product of multi-path reflection and is more prevalent at higher frequencies. As each operating environment varies in topography and/or man-made structures, the empirically derived results of signal attenuation experiments in the operating environment are used to optimize the selection of operational frequencies for the R/T units 26 and the positioning of the R/T units 26.

Accordingly, a key step of the foregoing method is the selection of the operational frequencies of the R/T units 26 from a range of frequencies between 90 kHz and 500 kHz. Preferably, a periodic sequence of frequencies within the aforementioned range are successively tested to identify two frequencies where distortion and attenuation of the positional information is lower than that of the other tested frequencies. Thereafter, frequencies between the two identified frequencies are successively tested to select an optimal operational frequency of the R/T units 26 where distortion and attenuation of the positional information is minimized.

Figure 8:
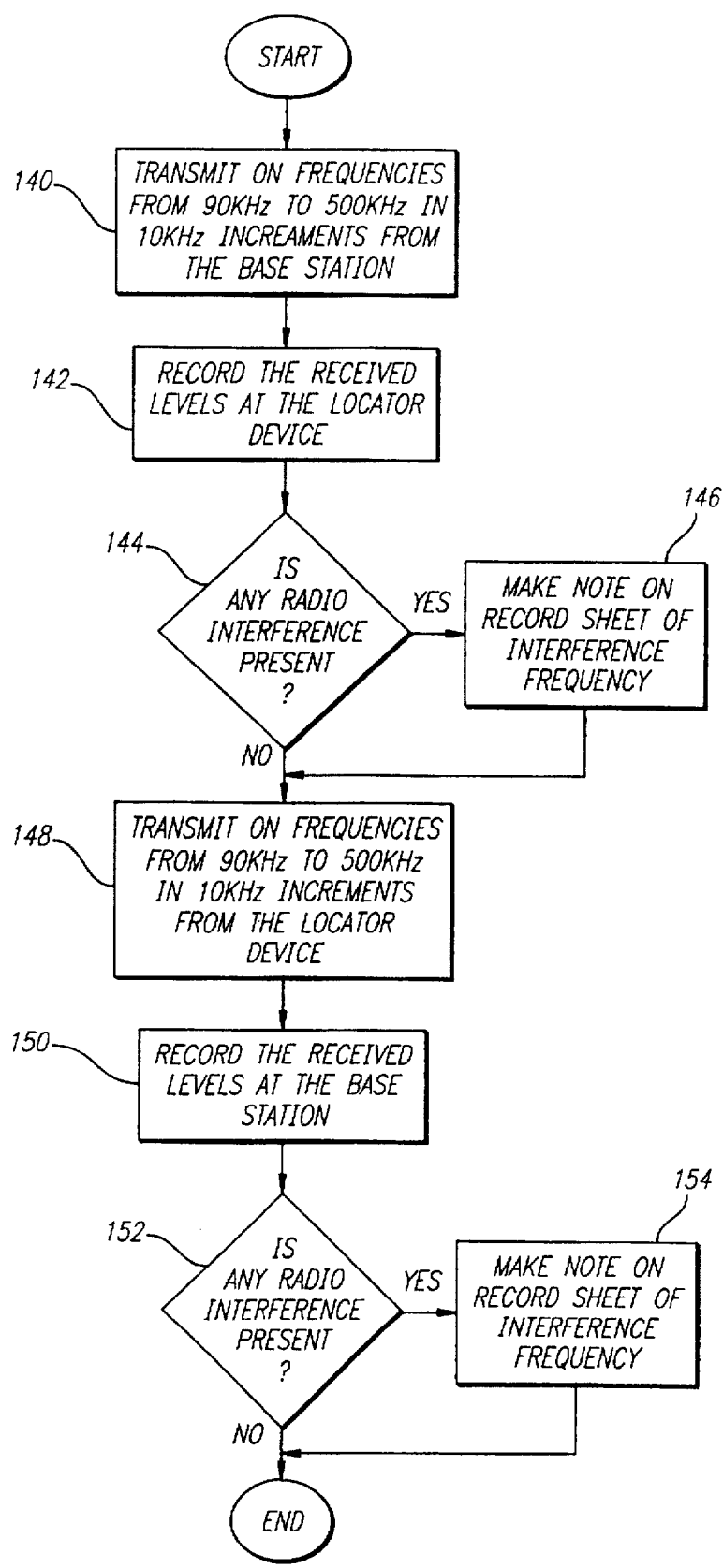
FIG. 8 is a flowchart illustrating a sequence of steps for empirically measuring signal attenuation data for different arrangements of positional detection units and receiver/transmitter units at different operational frequencies.

FIG. 8 is a flow chart illustrating how attenuation data is empirically gathered. Generally, the flow chart illustrates a sequence of steps for empirically measuring signal attenuation data for different arrangements of the positional detectional units 22 and the R/T units 26 at different operational frequencies. Signal attenuation data is preferably gathered in an urban area with a "test" R/T unit 26 being positioned in the vicinity of a large group of buildings. As shown in FIG. 8, a range of desired frequencies is tested by measuring the radio interference associated with transmissions from the R/T unit 26 to the positional detection unit 22, and vice versa. As discussed below in greater detail, the test sequence shown in FIG. 8 is performed a number of times with a "test" positional detection unit 22 being moved to different locations relative to the "test" R/T unit 26, taking into account the unique topography and/or man-made structures of the operating environment being characterized.

As shown in FIG. 8, for a particular positional detection unit 22 and R/T unit 26 arrangement, attenuation data is gathered as follows. At executable block 140, signals within a preferred frequency range are sequentially transmitted by the R/T units or base stations 26. For example, the frequency range may span between 90 kHz and 500 kHz in 10 kHz increments. At executable block 142, signal levels received at the positional detection unit or locator device 22, are recorded. If any radio interference is present, decisional diamond 144 directs the tester to make note of the interference frequency at executable block 146. Similarly, executable block 148 directs the tester (or automated test equipment, as the case may be) to transmit test signals from the locator device 22 between a predetermined range of frequencies. Preferably, the transmitted signals are between 90 kHz and 500 kHz in 10 kHz increments. At executable block 150, signal levels received at the base station 26 are recorded. After a determination is made at decisional diamond 152 as to whether or not radio interference is present, frequencies at which interference is present are recorded at executable block 154.

As mentioned supra, data is gathered pursuant to the test procedure illustrated in FIG. 8 with the locator device 22 being positioned at different locations within the test operating environment. An exemplary sequence of positions for the locator device 22 is provided below:

(1) the locator device 22 is positioned outside of any building and within "line of sight" of the test base station 26;

(2) the locator device 22 is relocated within a large building;

(3) the locator device 22 is relocated within a large building that has other large buildings between it and the antenna of the test base station 26;

(4) the locator device 22 is relocated within an interior room of the building in test step (3); and (5) the locator device 22 is positioned on a surface street that has many buildings between the locator device 22 and the antenna of the test base station 26. The locator device 22 may be positioned in other manners and as necessary to properly characterize varying operating environments (e.g., mountainous terrain, coastal and riparian geographies, unusual arrangements of buildings in urban centers, etc.).

After attenuation data is gathered as described above, the selection of operational frequencies begins by eliminating discrete frequencies where radio frequency interference was found to be present. For R/T unit 26 transmissions, an operating frequency is preferably selected as the remaining frequency with the lowest level of attenuation and distortion when received at the positional detection unit 22. For positional detection unit 22 transmissions, operational frequencies are preferably selected to be the frequency that provides the lowest power output with the lowest level of attenuation and distortion when received at the R/T unit 26.

Another key step of the foregoing method is the strategic positioning of the R/T units 26 throughout the operating environment of the system 20, such that distortion and attenuation of the positional information are minimized and further to substantially eliminate "dead zones" within the operating environment. Great care must be taken in positioning the antennas of the R/T units 26 such that there will be a minimal amount of distortion and attenuation. Antenna placement in urban areas is further complicated because tall buildings and areas where building densities are high potentially create "dead zones" unless the antennas are properly placed.

In rural areas and low density urban areas with building heights less than approximately three stories, antenna spacing may be greater than in more heavily developed urban areas. The spacing of R/T units 26 in rural or low density urban areas is limited only by the amount of attenuation and distortion detected during the signal attenuation testing. The preferred antenna spacing in such an environment is a rectangular arrangement with approximately 6–8 miles between each antenna. In a high density urban area the empirically gathered attenuation data is vitally important in determining the positioning of the R/T units 26. The attenuation data should also take into consideration antenna height so that the distances between the R/T units 26 may be optimally established thereby eliminating "dead zones" from such an operating environment. With the proper spacing of the R/T units 26, repeater stations need not be employed.

FIG. 7 is a functional block diagram of the processor unit 28 which is preferably embodied in a personal computer such as the Dell Dimension XPS P90. The processor unit 28 includes a processor antenna 162 which receives the positional information and a converter mechanism (not shown) for converting the received radio waves into a digitized form suitable for digital processing. A Data Input Module 164 receives (and, if necessary, decodes) the digitized positional information transmitted by each of the ground-based R/T units 26. A Query Authorization Module 166 ensures that only properly authorized personnel access the data which is stored in a Data Base Module 168. The Data Input Module 164 provides the positional information to the Data Base Module 168 which maintains and updates a data base of locations of each subject 24 over time. The processor unit 28 also includes a Query Module 170 which performs requested data base searches upon receiving proper authorization from the Query Authorization Module 166. Additionally, an Output Module 172 maintains archival records pertaining to each information access request and other pertinent data storage, retrieval and access matters and provides human-readable responses to authorized queries.

Figure 10:
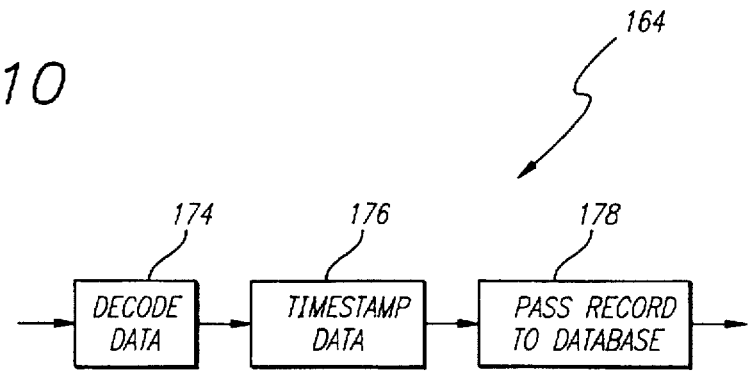
FIG. 10 is an operational flowchart of algorithms embodied within a Data Input Module of the processor unit of FIG. 9.

FIG. 10 is an operational flow chart of algorithms embodied within the Data Input Module 164. The data received by the Data Input Module 164 includes records of three fields:

1) Value identifying the subject 24
2) X-coordinate value of location of the subject 24
3) Y-coordinate value of location of the subject 24

The above data is decoded at block 174 and then time-stamped at block 176 with the current date and time. The records for each subject 24 are preferably received every 30 seconds. A five-field record (the three fields above and the date and time) is then passed at block 178 to the Data Base Module 168.

Figure 11:
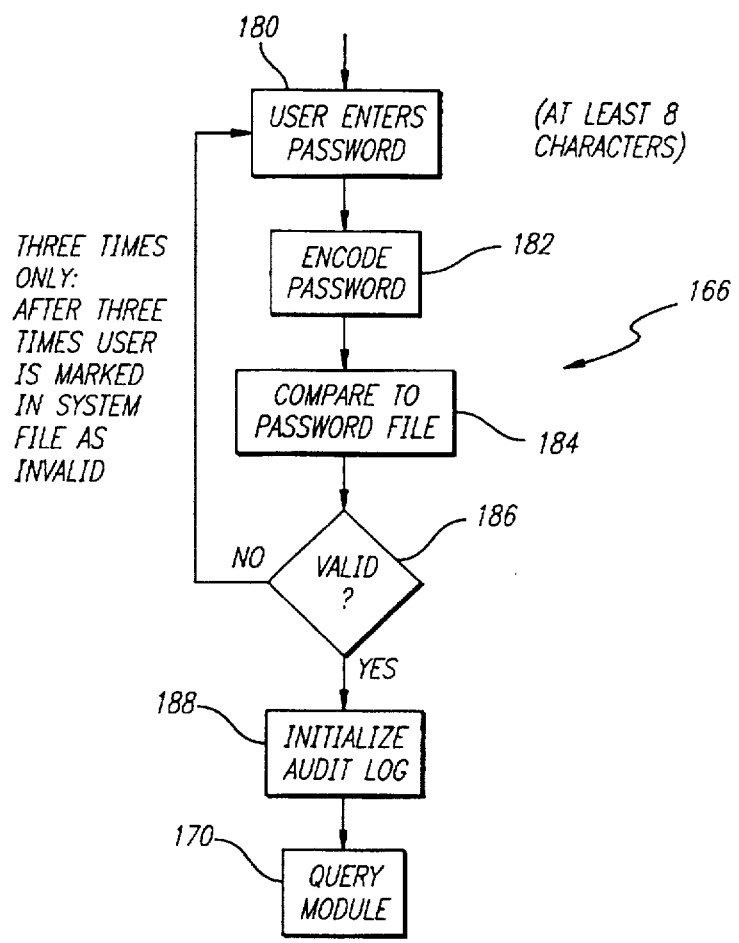
FIG. 11 is an operational flowchart of algorithms embodied within a Query Authorization Module of the processor unit of FIG. 9.

FIG. 11 is an operational flow chart of algorithms embodied within the Query Authorization Module 166. A potential user first enters a password at block 180. Passwords are advantageously used to authenticate a user's identification for at least the reasons that they are easily understood. However, passwords are often difficult to keep secret. For example, a short password can be guessed if enough variations are tried (e.g., a four character password allows only 10,000 variations). The present invention addresses the foregoing problem by assigning each user a password with eight or more characters. Furthermore, the password is periodically changed.

At block 182, the entered password is encoded and compared against a stored valid encoded password at block 184. Protection against system intruders is provided by employing an encoder function f(x) that is very difficult to invert, but simple to compute. If an invalid password is entered, decisional diamond 186 redirects execution of the Query Authorization Module 166 as shown in FIG. 11. The number of incorrect passwords given when a user is attempting to log in is counted. If there are more than a predetermined number of attempts, such as three, the identified user is not allowed access to the system again until that user's password has been changed. The monitoring of such suspicious patterns of activity is referred to as "threat monitoring." Another authorization management technique called "audit log" is provided at block 188. The audit log technique records the time, user and action within the system during a user's session. After a security violation, the audit log is used to determine how and when the security violation occurred and perhaps to additionally access the amount of damage done.

Figure 12:
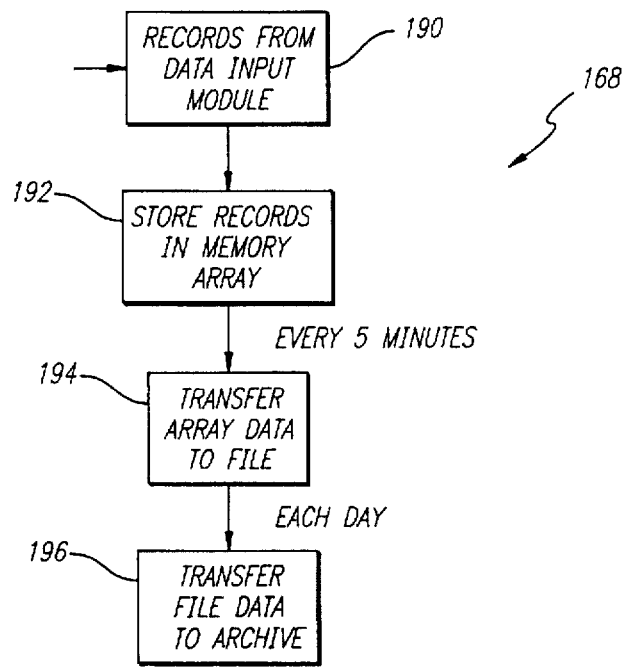
FIG. 12 is an operational flowchart of algorithms embodied within a Data Base Module of the processor unit of FIG. 9.

FIG. 12 is an operational flow chart of algorithms embodied within the Data Base Module 168. By way of example, five-field records from the Data Input Module 164 are provided to the Data Base Module 168 at block 190. The data base includes two files and one array in memory. The array collects the most recent data received from the Data Input Module 164 and sequentially stores records as received at block 192. Thus, received records are stored in chronological order with the time-date field combination serving as an index of the data.

At a predetermined interval, such as every five minutes, the records in the array are transferred at block 194 to the first file representing the most recent accumulated data. The file includes a predetermined amount of such transferred data, such as all of the data transferred during the last seven days. Thus, if the records are transferred every five minutes, a file capable of storing the last seven days of data will include 20,160 records for one subject. At a second longer predetermined period of time, such as once per day, the earliest period's data is transferred to an archive file at block 196. The data is organized as described above for two reasons. First, a large amount of data must be stored which necessitates incremental archiving. Second, the Query Module 170 operates on the two files, not the array, to guard against any read-write collisions.

The Data Base Module 168 also embodies advanced data processing capabilities such as the trajectory ("vector") and plot ("density") features discussed supra.

Figure 13:
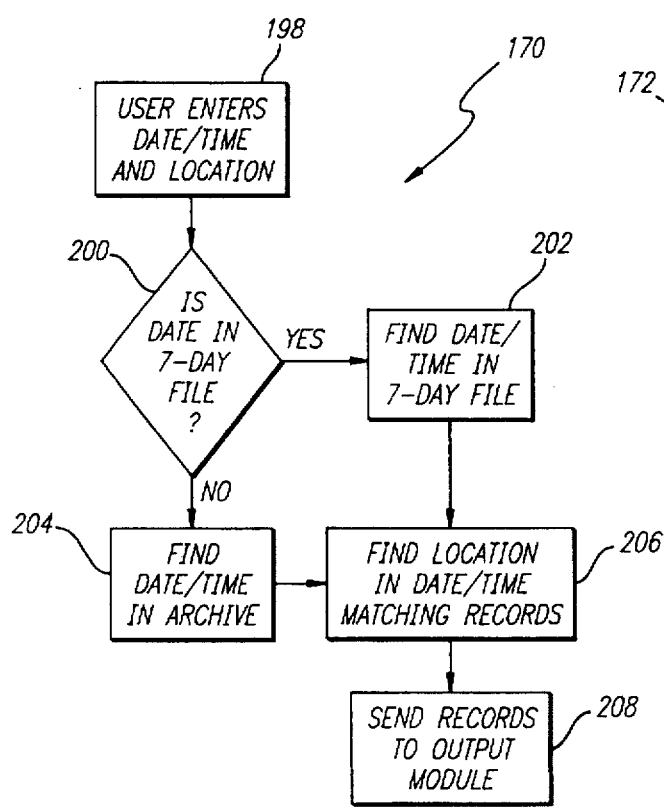
FIG. 13 is an operational flowchart of algorithms embodied within a Query Module of the processor unit of FIG. 9.

FIG. 13 is an operational flow chart of algorithms embodied within the Query Module 170. At block 198, a user input for data base queries is received into the Query Module 170. Queries may be appropriately limited, for example, the Query Module 170 may be implemented such that the only query available is "given a date, time and location, list the subjects who were at the location at the specified date and time." A range of times may be specified as appropriate. Depending upon the date specified by the user, a decisional diamond 200 directs subsequent execution of the Query Module 170 to either a block 202 or to a block 204 where recent or archived data are searched, respectively. After the appropriate file is found using the base-time index, the Query Module 170 searches at block 206 through time-date matching records (using the time range) for the location. Advanced features such as "vicinity checking" may be implemented into the Query Module 170 by providing a tolerance of a predetermined number of coordinate values in both directions (e.g., 10 coordinate values). At block 208, matching records are sent to the Output Module 172.

Figure 14:
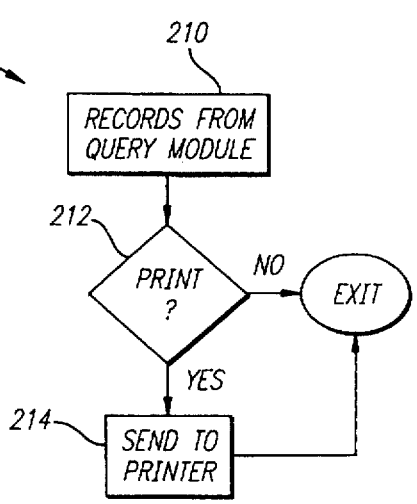
FIG. 14 is an operational flowchart of algorithms embodied within an Output Module of the processor unit of FIG. 9.

FIG. 14 is an operational flow chart of algorithms embodied within the Output Module 172. At block 210, records from the Query Module 170 are received by the Output Module 172. The records are displayed on a screen which additionally provides the user with an option at decisional diamond 212 to receive a printed hard copy of the records. Such a printout is provided at block 214.

In conclusion, it is to be understood that the foregoing detailed description and the accompanying drawings illustrate the principals of the invention. However, various changes and modifications may be employed without departing from the spirit and scope of the invention. Thus, by way of example and not of limitation, the R/T units 26 may alternatively comprise existing, as well as yet to be developed, navigational systems. For example, the Loran-C System, or a similar system, which extends beyond the line-of-sight and has long range and high accuracy may be employed in yet another alternative embodiment of the positional information storage and retrieval system. Accordingly, the present invention is not limited to the specific form shown in the drawings and described in detail hereinabove.

What is claimed is:

1. A system for storing and retrieving positional information of a subject wearing a positional detection unit and moving within an operating environment of the system comprising:

a positional detection unit adapted to receiving signals including coordinate information, to process said coordinate information to generate positional information including a position fix of the positional detection unit, and to transmit said positional information at varying time intervals as determined by magnitudes of said signals and changes in a position of said positional detection unit within the operating environment;

a plurality of receiver/transmitter units (R/T units) adapted to transmit said signals including coordinate information and to receive and transmit said positional information; and a processor unit adapted to receive said positional information from said plurality of R/T units and to process said positional information to track an absolute position of said positional detection unit within the operating environment.

2. The system of claim 1 wherein said positional detection unit further comprises:

a bracelet apparatus;

a receiver attached to said bracelet apparatus, said receiver being adapted to receive said signals including coordinate information;

microcircuitry within said bracelet apparatus adapted to process said coordinate information of said R/T units to determine said positional information; and a transmitter attached to said bracelet apparatus, said transmitter being adapted to transmit said positional information.

3. The system of claim 2 wherein said bracelet apparatus is configured for attachment to a subject and wherein said microcircuitry detects a malfunctioning condition of said positional detection unit or a detachment of said bracelet apparatus from the subject.

4. The system of claim 2 wherein said transmitter transmits radio waves carrying said positional information.

5. The system of claim 2 wherein said microcircuitry comprises an application specific integrated circuit (ASIC).

6. The system of claim 2 wherein said microcircuitry includes circuitry adapted to process said coordinate information pursuant to a triangulation technique.

7. The system of claim 1 wherein said plurality of ground-based R/T units are strategically positioned throughout the operating environment and wherein operational frequencies of said plurality of ground-based R/T units are selected such that distortion and attenuation of said positional information are minimized.

8. The system of claim 1 wherein said processing unit determines said position of said positional detection unit at predetermined sampling intervals and wherein said processing unit further comprises:

a storage device for storing data indicating said absolute position at said predetermined sampling intervals.

9. The system of claim 8 wherein said positional detection unit is configured for attachment to a subject and wherein said processing unit comprises a Data Base Module for processing said stored data to determine a trajectory of the subject.

10. A system for storing and retrieving positional information of at least one subject moving within an environment comprising:

a positional detection unit secured to at least one subject, said positional detection unit being adapted to receive signals including coordinate information, to process said coordinate information to generate encrypted positional information including a position fix of the positional detection unit, and to transmit said encrypted positional information at varying time intervals as determined by magnitudes of said signals and changes in a position of said positional detection unit within the operating environment;

a plurality of receiver/transmitter units (R/T units) adapted to transmit said signals including coordinate information and to receive and transmit said encrypted positional information, operating frequencies of said R/T units being selected and said R/T units being positioned throughout the operating environment such that distortion and attenuation of said encrypted positional information are minimized; and a processor/memory unit adapted to receive said encrypted positional information over time from said R/T units, to track a location of each subject over time, to store said location of each subject over time, and to determine which, if any, subject was near a selected location near any point in time, said processor/memory unit including a query module adapted to enable a user of the system to provide user inputs to the system including a date, time and location of a crime and to request a system output indicating which of said subjects were near said crime location near said date and time of said crime.

* * * * *